Patented Mar. 1, 1932

1,847,123

UNITED STATES PATENT OFFICE

FRANK SIGFRID MALM, OF CHICAGO, ILLINOIS, ASSIGNOR TO WESTERN ELECTRIC COMPANY, INCORPORATED, OF NEW YORK, N. Y., A CORPORATION OF NEW YORK

COMPOSITIONS OF MATTER AND METHODS OF THEIR PREPARATION

No Drawing.    Application filed March 6, 1929.  Serial No. 344,925.

This invention relates to compositions of matter and methods of their preparation, and more particularly to compositions used in electrical industries for their insulating and other electrical properties.

The invention further relates to a product of rubber or similar hydrocarbon substances having stabilized electrical characteristics, and to methods of producing such a product.

The objects of the invention are to provide a rubber or similar hydrocarbon product having in a high degree the characteristics desirable in insulating materials, especially for use under water; to provide a rubber product having low water-absorption characteristics; and to provide a rubber product which may be used as an ingredient in insulating materials for submarine cables, particularly in cables employed for speech or other relatively high frequency transmission.

In accordance with the invention, rubber or similar hydrocarbon substance, either in the form of latex or in a dispersed solid form, is subjected to the action of water at a temperature below the boiling point, coagulated, and the resulting product washed in the solid form. The treatment appears to cause a coagulation of the proteins contained in the rubber into non-water-absorbent form. The washing to which the rubber is subjected removes a portion of the proteins, but the major portion thereof may remain in the rubber without materially injuring its mechanical or electrical characteristics. Rubber treated in accordance with this invention is particularly suitable as an ingredient in insulating material for submarine cables, and will retain its insulating and other electrical properties practically unimpaired for long periods of time when immersed in a salt solution similar to sea water.

The invention and its relation to the prior art will be understood from the following description.

Gutta-percha and balata or mixtures of the two are the only materials which have been generally accepted as suitable for the insulation of submarine cables with high transmission qualities. Various substitutes for these materials have been proposed, including vulcanized rubber, as disclosed in the application of R. R. Williams and A. R. Kemp, Serial No. 678,509, filed December 4, 1923. Rubber insulation formed in accordance with the above application, like all rubber insulations, must be vulcanized in position on the conductor and the cable core is very likely to become deformed during the process of vulcanization, unless expensive and troublesome precautions are taken. Also, vulcanizable rubber alone is too resilient for easy application to a conductor by means of an extrusion machine, which fact necessitates the inclusion in it of some solid, finely divided filler, which has the undesirable effect of raising the dielectric constant of the finished insulation.

Certain thermo-plastic conversion products of rubber have been proposed as ingredients of a compound for submarine insulation. Such conversion products are obtained by treating rubber with sulphuric acid or an aromatic derivative of sulphuric acid. Although the conversion products themselves have not the essential mechanical properties of gutta-percha, submarine insulating compounds of apparently satisfactory electrical and mechanical properties may be produced by mixing the conversion products with ordinary crude rubber, gutta percha, or balata. However, the production of the conversion products is a relatively elaborate and expensive operation in view of the necessity of an extremely careful control of the reactions and a high degree of skill in the process of removing the by-products of the reaction.

It has also been proposed to use raw rubber in admixture with vegetable waxes as a submarine insulating compound. Such a compound is described in United States Patent No. 699,383, dated May 6, 1902, of Adolf Gentsch, and it has been found that such compounds may possess fairly satisfactory mechanical properties. However, they are not electrically stable, and it is for this reason that they have not been adopted for use in insulating submarine cables.

In experiments with rubber for use in submarine insulating compounds it has been found that in the unmixed, unvulcanized state, thoroughly washed crude rubber is not electrically stable when immersed in water, since during such immersion it undergoes a gradual increase of dielectric constant and decrease of insulation resistance up to a certain point, when sudden and almost complete failure of the material with respect to insulating properties occurs. It appears that this sudden failure of crude rubber in water is due to protein films which pervade the mass, forming, when thoroughly wet, paths of low electrical resistance throughout the rubber. It is therefore desirable when unvulcanized rubber is to form an ingredient of a submarine insulation that this tendency to sudden degradation should first be eliminated from the raw materials. The protein films when coagulated are also believed to permit the penetration of water and thereby accelerate the oxidation and decomposition of the rubber. The present invention largely eliminates these objections by so altering the protein structure as to make it non-absorbent of water.

A process for removing proteins from rubber is disclosed in my copending application, Serial No. 327,487, filed December 20, 1928, now Patent 1,752,531, wherein the rubber is subjected to the action of a sodium chloride solution at a temperature above 100° C. for an hour or more to render the proteins soluble, and is then washed to remove the proteins.

According to the present invention, the rubber either in the form of crude rubber or uncoagulated latex is diluted with water in such proportions as to provide for considerable dispersion of the rubber content, and the resulting mixture is subjected to a temperature below 100° C. for a short period of time, after which the rubber content of the mixture is coagulated and washed. It seems probable that of the various proteins naturally occurring in rubber some are converted by the process to soluble products and thereafter removed by the washing, but the greater portion are apparently coagulated and thereby rendered non-water absorbent. Some of the resins naturally occurring in the rubber may likewise be broken down into soluble substances. After the heat treatment the rubber is coagulated by acetic acid or other coagulants, and is then removed from the liquid and washed in the usual manner, but it will generally be found advantageous before washing to add a softener such as petrolatum, pine tar, or palm oil in order to facilitate the removale of impurities. Where the rubber is to be mixed with balata or similar substance, as described below, the balata may be added to the rubber before washing to soften it, in which case no other softener need be used.

In practicing one embodiment of the invention, rubber latex, diluted by the addition of 20 parts of water to five parts of latex, was heated to 92° C., and three parts of a 5% acetic acid solution at room temperature was then added, the mixture being stirred until the latex was coagulated. The coagulum was then removed from the liquid and washed for twelve minutes in a rubber washer and then dried.

Samples of this product were immersed in a 3.5% sodium chloride solution and test data taken at intervals over a period of 195 days, at the end of which period the water content of the samples had stabilized at about 1.05% by weight. Test samples were also made by mixing a portion of the rubber product with an equal amount of prime amber balata, and forming into sheets .05" in thickness. These sheets were likewise immersed in a 3.5% sodium chloride and test data taken over a period of 195 days, at the end of which period the electrical properties of the samples had stabilized at the following values: capacity in microfarads, .225; dielectric constant, 2.66; conductance in micromhos, .17. In making these tests, the samples were removed from the salt solution, dried in a uniform manner, placed between circular electrodes 5" in diameter, and tested with an alternating current of a frequency of 900 cycles per second at room temperature and at atmospheric pressure.

The water content of an insulating material after prolonged immersion is a fairly safe index of its electrical and mechanical properties, and the water content of 1.05% for the treated rubber compares favorably with the corresponding value of gutta percha, which in grades suitable for use in submarine cables usually stabilizes at about 1.25% by weight. The value of the dielectric constant of 2.66 for the treated rubber measured at room temperature and atmospheric pressure also compares favorably with the dielectric constant of gutta percha, which in good commercial grades is seldom below 3.0.

It should be noted that the maximum temperature used in this process is below the boiling point of the mixture. The necessity for keeping the mixture under pressure during a prolonged heat treatment is therefore eliminated. The temperature limits for any specific requirements and for any specific type of rubber, at variance with the instance above described, must be experimentally determined. However, the specific procedure described above is typical of those which produce materials of satisfactory mechanical and electrical properties.

The rubber product derived from the method above described is not mechanically adapted to be used alone as a cable insulation, being too resilient to permit proper extrusion to accurate dimensions, and liable to deformation at ordinary temperatures. Suitable compounds for submarine insulation may be obtained by mixing such product with hard waxes, balata and/or other similar substances which melt or soften at moderate temperatures, and which impart the property of thermo-plasticity to the rubber, the added substances themselves possessing suitable electrical characteristics and a suitable resistance to the penetration of water. The method of adding such substances to form a cable insulation is more fully described in the applications of Charles Martell, Serial Nos. 308,610 and 308,611, filed September 27, 1928.

The following is an example of a composition suitable for submarine cable insulation. With the product resulting from the treatment of rubber latex, as described above, an insulating compound may be prepared by mixing with 35 pounds thereof, 35 pounds of deresinated commercial balata, and 30 pounds of refined Montan wax.

The treatment proposed in accordance with this invention may be applied to the various species of rubber and to other gums, such as balata and gutta percha, in which it may be desirable to coagulate the protein content.

Although this invention has been described from the point of view of submarine cable insulation, it is obvious that it has a more general application to insulating materials which may be subjected to the influence of humidity of water, for example, ordinary rubber-covered wire, and shore ends of submarine cables. The rubber product resulting from this heat treating process is readily vulcanized and may in that form find a broad application wherever the influence of water is to be resisted, as in rubber shoes, gas masks, and similar articles.

What is claimed is:

1. A process of treating a material containing rubber hydrocarbon and a naturally occurring nitrogenous substance which comprises diluting the material with water and subjecting the resulting mixture to a temperature of about 90° C. to coagulate said nitrogenous substance.

2. A method of treating rubber latex containing hydrocarbon and another substance which is insoluble in water and which is highly water absorbent, which comprises rendering said other substance non-absorbent of water by diluting the latex with water and subjecting the resulting mixture to a temperature between 90° C. and 100° C., and washing the resulting product.

3. A method of producing from latex an unvulcanized rubber material which has stable insulating properties when subjected to the continuous influence of water, which comprises diluting the latex with water, heat treating the resulting mixture at a temperature slightly below 100° C., coagulating the latex with acetic acid, and washing and drying the rubber material.

4. A method of producing a rubber material from latex containing a natural nitrogenous substance, which comprises diluting the latex with water, heating the resulting mixture to about 92° C. to coagulate the nitrogenous substance, then causing the latex to form a coagulum, and then washing the coagulum to reduce the amount of the nitrogenous substance.

In witness whereof, I hereunto subscribe my name this 20 day of February A. D., 1929.

FRANK SIGFRID MALM.